UNITED STATES PATENT OFFICE.

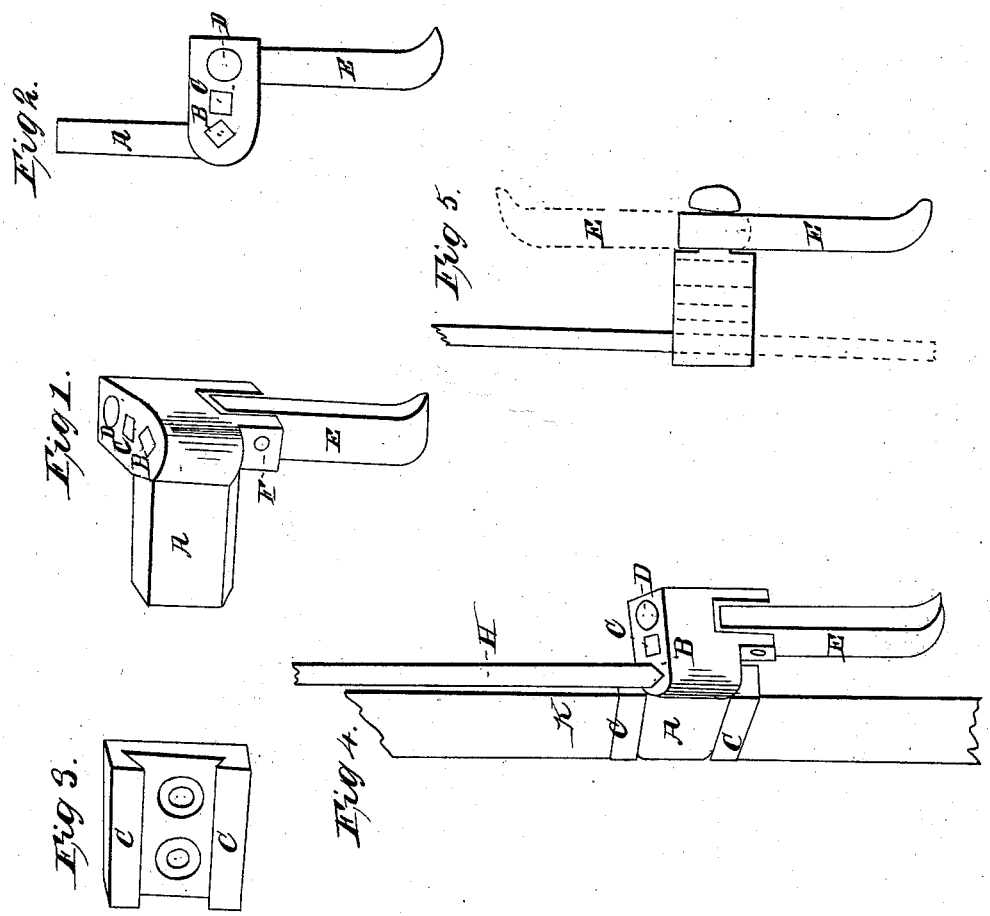

ALEX. J. WALKER, OF NEW YORK, N. Y.

BRACKET FOR DOOR-SPRINGS.

Specification of Letters Patent No. 15,864, dated October 7, 1856.

*To all whom it may concern:*

Be it known that I, ALEX. J. WALKER, of the city, county, and State of New York, have invented a new and useful Improvement in the Construction and Mode of Attaching Brackets for Steel-Rod Door-Springs; and I do hereby declare that the following is a full, clear, and exact description thereof, reference being had to the annexed drawings, forming part of this specification, in which—

Figure 1, is a perspective view of the bracket to be applied to the end of the spring rod. Fig. 2, is a top view of the same with the lever extended. Fig. 3, is a perspective view of the socket that is to be inserted in the edge of the door or casing to receive and hold the bracket in its place. Fig. 4, is a perspective view, and shows the socket as attached to the casing, with the bracket applied to the end of the spring inserted in it. Fig. 5 is an end view of the bracket with the lever attached in a different position.

This invention relates to the construction and mode of attaching to the door or casing the brackets of steel rod door springs, and consists in constructing one of the brackets with two holes for receiving and holding the spring when in operation instead of one, (said holes so arranged in relation to each other that by changing the spring from one to the other greater nicety can be observed when applying it, in regulating the power with which it shall act,) and also with another hole large enough to allow the end of the spring to turn freely in it, into which it can be put when no power is required, and of securing said bracket in its place by means of a socket inserted in the door or casing, and also of attaching to said bracket a lever to assist in twisting the spring when applying it. The advantages arising from this arrangement are these: It overcomes the great difficulty of applying these springs, which is to give the spring sufficient twist to enable it to act on the door, and then hold the bracket until it is secured in its place, and it enables the power of the spring to be regulated by eighths instead of quarters of a turn, and by using a socket instead of screw for securing the bracket it enables its being more readily removed and reapplied when it is necessary either to alter or remove the power. The large hole in the bracket into which the spring is inserted when not operating prevents its getting in the joint of the door and interfering with its shutting, as sometimes happens when the end of the spring is left uncontrolled.

To enable others to make and use my invention I will proceed to describe its construction and use more fully.

Figs. 1 and 2 show the construction of the bracket. The part A is intended to be inserted in the socket shown in Fig. 3 and is beveled on the edges, so as to fit the groove in said socket, which groove is wider at the bottom than at the top. The holes B and C are made of the same size and shape as the end of the spring and are to receive and hold it when in operation. They are so placed that a corner of one faces a side of the other, so that by changing the spring from one to the other its power can be regulated by eighths instead of by fourths of a turn. The hole D is made large enough to allow the end of the spring to turn freely in it, and is intended merely to receive and keep the spring in its proper position when not operating. The lever E is attached by the pin F passing loosely through it, so that it can be raised to a horizontal position when attaching or removing the bracket and drop down out of the way when not required. If desirable the lever can be attached on the end of the bracket, as shown in Fig. 5, which will enable its being used with either side up to receive the spring.

I do not claim the application of steel rods to doors to act as springs; but

What I claim as new and desire to secure by Letters Patent is—

1. Constructing one of brackets used for attaching such rod, with an additional hole for receiving and holding them when in operation, said additional hole bearing such a relation to the first that by changing the spring from one to the other greater nicety can be observed when applying it, in regulating the power with which it shall act, and of attaching to said bracket a lever to assist in twisting the spring when applying it.

2. And I also claim securing said bracket in its place by means of a socket inserted in the door or casing, or any other means, substantially the same, that will instantly secure it, after it has been applied to the spring and the necessary power obtained, and will also allow of its being easily removed and reattached when it is desirable either to alter or entirely remove the power.

ALEX. J. WALKER.

Witnesses:
   STEPHEN CONOVER, Jr.,
   STEPHEN C. MCCLURE.